G. W. McGILL.
BUTTON.

No. 65,250.  Patented May 28, 1867.

Witnesses.

Inventor:

United States Patent Office.

GEORGE W. McGILL, OF WASHINGTON, DISTRICT OF COLUMBIA.

Letters Patent No. 65,250, dated May 28, 1867.

---

IMPROVEMENT IN BUTTONS.

---

The Schedule referred to in these Letters Patent and making part of the same.

---

TO ALL WHOM IT MAY CONCERN:

Be it known that I, GEORGE W. McGILL, of the city of Washington, and District of Columbia, have invented a new and useful Improvement in the Means of Attaching Buttons to Textile Fabrics and the like substances; and I do hereby declare that the following is a full, clear, and exact description thereof, reference being had to the annexed drawing, in which—

Figure 6:
Figure 7:
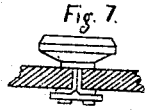
Figure 8:
Figure 9:

Figures 6, 7, and 8 are views of buttons attached to the cloth by means of my improvement, the shank and the cloth being shown in section.

Figures 9, 10, 11, and 12 are views of shanks detached from the buttons.

Figures 13, 14, 15, 16, and 17 are thin metal washers to be placed on the opposite side of cloth from the buttons, over which the shanks are inclined down, as hereinafter more fully explained.

The nature of my invention consists in making the shank by which the button is attached to the garment of a bent strip of thin, pliable metal, so bent and pressed together as to form a double or split shank, consisting of two parts, which will penetrate the cloth together, making but one hole; and in providing a metal washer to be placed on the reverse side of the cloth from the button, over which the two parts composing the shank may be clinched down after passing through the cloth and being spread asunder.

Figure 1:
Figure 1 is a sectional view of a button adapted to receive the shank by which it is to be attached to the garment.
Figure 2:
Figure 2 is a sectional view of a button of another form with the shank attached.
Figure 3:
Figures 3 and 4 are elevations of buttons of different forms with shanks attached.
Figure 4:
Figure 5:
Figure 5 is a sectional view of a button with a shank attached, consisting of a strip of metal bent into the form of a staple, and the two legs thereof pressed close together.
Figure 10:
Figure 11:
Figure 12:
Figure 13:
Figure 14:
Figure 16:
Figure 15:
Figure 17:

I prefer to make the shank by bending a strip of metal double in the form of a T, as shown in fig. 10, on the principle of my paper-fastener, as described in the patent issued to me July 24, 1866, except that the head should be made circular; but other modes of making it may be adopted, the material point being to produce a double or split shank consisting of two parts, which will penetrate the cloth together, making but one hole, and which may be clinched down separately on the reverse side of the cloth from the button. The shank may be made separately and detachable from the button, and inserted through a central hole, as shown in fig. 1, or the head may be firmly fixed in the button, as shown in fig. 3, or the shank may consist of a strip of metal looped around a bar in the button, as shown in fig. 5. When the double or split shank is pushed through the cloth, a thin metal washer is to be applied, and the points of the shank spread asunder and clinched down over it. The washer may have a hole in the centre, through which the shank will pass, as shown in figs. 13, 16, and 17, or it may be recessed on two opposite sides, as shown in figs. 14 and 15, in which last-mentioned case the points of the double shank will first be spread apart and pressed down flat upon the cloth, the washer then applied, and the points of the shank bent inward and clinched down over it, as shown in figs. 7 and 11.

What I claim as my invention, and desire to secure by Letters Patent, is—

The double or split metal shank for a button, herein described, in combination with a metal washer, constructed and applied substantially as described.

GEORGE W. McGILL.

Witnesses:
J. J. COOMBS,
Jos. L. COOMBS.